United States Patent [19]

Iwata et al.

[11] Patent Number: 4,780,831
[45] Date of Patent: Oct. 25, 1988

[54] GRAPHIC DATA PROCESSOR

[75] Inventors: Akira Iwata; Isao Horiba, both of Aichi, Japan

[73] Assignee: Hitachi Medical Corporation, Japan

[21] Appl. No.: 755,824

[22] Filed: Jul. 17, 1985

[30] Foreign Application Priority Data

Aug. 1, 1984 [JP] Japan .................. 59-162039

[51] Int. Cl.[4] .............................. G06G 7/19
[52] U.S. Cl. .................. 364/484; 364/726; 364/576; 382/43; 73/620
[58] Field of Search ............... 364/480, 414, 726, 827, 364/481, 482, 483, 484, 485, 576, 570; 378/4; 358/166, 260; 178/3; 382/43; 73/597, 599, 620

[56] References Cited

U.S. PATENT DOCUMENTS

| | | | |
|---|---|---|---|
| 3,872,293 | 3/1975 | Green | 364/576 |
| 3,952,186 | 4/1976 | Speiser et al. | 364/726 |
| 4,063,549 | 12/1977 | Beretsky et al. | 364/726 |
| 4,075,483 | 2/1978 | Tancrell et al. | 378/2 |
| 4,079,417 | 3/1979 | Scudder, III | 358/166 |
| 4,164,788 | 8/1979 | Jain | 382/43 |
| 4,189,775 | 2/1980 | Inouye et al. | 382/43 |
| 4,205,375 | 5/1980 | Inouye et al. | 378/901 |
| 4,282,438 | 8/1981 | Nishida et al. | 378/11 |
| 4,471,445 | 9/1984 | Pernick | 364/827 |
| 4,575,799 | 3/1986 | Miwa et al. | 73/599 |

OTHER PUBLICATIONS

Kowel et al.: Programmable Multifunction Processor, SPIE, vol. 178, pp. 196–203, 17–18, Apr., 1979.

Primary Examiner—Parshotam S. Lall
Assistant Examiner—V. N. Trans
Attorney, Agent, or Firm—Gerald J. Ferguson, Jr.

[57] ABSTRACT

A graphic data processor for processing two-dimensional signals or one-dimensional signals such as observed graphic data. One graphic data processor includes circuitry for effecting two-dimensional Fourier conversion of the observed graphic data signals such that components occur with respect to first through fourth image limits on the resultant two-dimensional Fourier plane; circuitry for forming processed graphic data including circuitry for nullifying all but one of the components from the first through fourth image limits and circuitry for effecting two-dimensional inverse Fourier conversion on the one component to derive the processed graphic data; circuitry for determining the phase component of the processed graphic data; and circuitry for determining the local gradient of said phase component.

Another graphic data processor includes circuitry for effecting one-dimensional Fourier conversion of the observed graphic data signals; circuitry for forming processed graphic data including circuitry for nullifying negative components, leaving positive components and circuitry for effecting one-dimensional inverse Fourier conversion on one component to drive the processed graphic data; circuitry for determining the phase component of the processed graphic data; and circuitry for determining the instantaneous frequency.

5 Claims, 13 Drawing Sheets

GRAPHIC DATA PROCESSOR

BACKGROUND OF THE INVENTION

1. Field of the Invention

The invention is directed to a graphic data processor for processing observed graphic data (hereafter graphic data signals). In particular, it is directed to a technique for the quantitative detection of the composition and grains in observed graphic data.

2. Description of the Prior Art

In the past, Fourier conversion has been generally applied in frequency analysis. For example, distribution of the frequency components may be determined by the following equation:

$$X(k) = \sum_{n=0}^{N-1} x(n) \cdot \exp(-j2\pi kn/N) \quad (1)$$

where one-dimensional signal x(n), (n=0≈N−1), is obtained by AD conversion at a sampling frequency of Fs(Hz) over a period of T sec, where $T = N/Fs$, and j=the imaginary number.

In this method, however, signals are processed as a whole, and what is determined is the sum of the frequencies over the entire signal range. To obtain partial frequency distribution in this method, a signal has to be divided into a number of ranges, external Fourier conversion applied to each of these ranges, and a frequency distribution obtained for each. It is, however, not possible to calculate in this method the frequency every sampling period $Ts(ACC) = 1/Fs$ (momentary frequency of the signals) because of the following relation between the span Ta of the ranges and frequency resolution Fr.

$$Fr = 1/Ta \ldots \quad (2)$$

The two-dimensional Fourier conversion shown in equation (3) is applied also to analyze spatial frequencies of images:

$$X(k,l) = \sum_{m=0}^{N-1} \sum_{n=0}^{N-1} x(m,n) \cdot \exp\left(-j2\pi\left(\frac{mk}{M} + \frac{nl}{N}\right)\right) \quad (3)$$

However, this method of analysis also applies to images as a whole so that the spatial frequency distribution obtained here is the sum of the frequencies for the entire image. Thus, to apply the method to an image in order to determine the local spatial frequency distribution in it, the image must be divided into a number of small areas, two-dimensional Fourier conversion applied to each to these areas, and a spatial frequency distribution for the areas obtained. As in the case of one-dimensional signals, the more an area is reduced in size, the more does the frequency resolution deteriorate making it impossible to determine local spatial frequency for each picture element.

OBJECTS OF THE INVENTION

A primary object of this invention is to provide an image processor for processing observed signals and also to provide the technology for quantitative detection of the local composition and dot pattern corresponding to the observed signals. Another object of the invention is to provide, in a device for processing two-dimensional signals like graphic data signals, a technology for the determination of local frequency graphic data by obtaining, respectively, two-dimensional analytical signals from two-dimensional observed signals and local spatial graphic data frequencies from local gradients of the phase of two-dimensional analytical signals.

Still another object of the invention is to provide, in a device for processing observed signals on one-dimensional basis, a technology for the determination of instantaneous frequency graphic data by obtaining, respectively, one-dimensional analytical signals from observed signals and instantaneous data frequencies, in which is accomplished a differential operation of the phase of one-dimensional analytical signals which are obtained from observed signals.

These objects of the invention and specific characteristics of the invention are detailed in the description and drawing provided hereunder.

SUMMARY OF THE INVENTION

The following is a summary of the representative items constituting the invention described above.

In a graphic data processor which processes twodimensional graphic data signals, two-dimensional Fourier conversion is applied to observed signals, nullifying all except one of the four components on the corresponding two-dimensional Fourier plane from the first to the fourth image limits, creating graphic data by two-dimensional inverse Fourier conversion, obtaining the phase component of the above graphic data signal, and quantitativity determining the local dot pattern of the picture data or the phase corresponding to change in the concentration value. Furthermore, calculating local gradients from the phase components and obtaining local graphic data frequency from the local gradients of the phase, the local dot pattern of the picture data or the frequency corresponding to change in the concentration value is quantitatively determined.

Furthermore, in a graphic date processor which processes observed signals, one-dimensional Fourier conversion is applied to the observed signals, nullifying only the negative frequency components, obtaining one-dimensional analytical signals by inverse one-dimensional Fourier conversion, determining the instantaneous frequencies by accomplishing a differential operation of the phase components of the one-dimensional analytical signals, obtaining the graphic data from the instantaneous frequencies, and quatitatively determining the local composition and data pattern corresponding to the observed signals.

PRINCIPLE OF THE INVENTION

It is known that the real and imaginary parts of the Fourier conversion of causality signals are in Hilbert conversion relation with respect to each other. Also, the real part can be made equal to the observed signal by nullifying the negative frequency component of the Fourier conversion of the observed signals (this being definedas causality on the frequency axis), thereby obtaining a complex number signal of which the imaginary part is the Hilbert conversion of the observed signal. In general, this is referred to as an analytical signal, the properties of which satisfy the analysis function. From the analytical signal thus determined, it is possible to obtain the instantaneous amplitude (envelope) and instantaneous phase of the observed signal, and, furthermore, the instantaneous frequency from a time differential of the phase. This method of analysis can be extended and applied to two-dimensional signals also, determining local spatial frequency of the graphic data and from it obtaining the graphic data.

Hilbert conversion for the observed signal x(t) is given by equation (4):

$$\hat{x}(t) = x(t) * \frac{1}{\pi t} = \frac{1}{\pi} \int_{-\infty}^{\infty} \frac{x(\tau)}{t - \tau} d\tau \tag{4}$$

where the * represents the convolution. Fourier conversion of relation (4) gives relation (5)

$$\hat{X}(\omega) = -j \, \text{sgn}\omega x(\omega) \tag{5}$$

where $X(\omega)$ is a Fourier conversion of x(t) and $\hat{X}(\omega)$ is a Fourier conversion of $\hat{x}(t)$.

Furthermore, sgn$\omega$ is a sign function given by the following:

$$\text{sig}\omega = \begin{cases} 1 & \omega > 0 \\ 0 & \omega = 0 \\ -1 & \omega < 0 \end{cases} \tag{6}$$

Here causality conforms to Fourier conversion $X(\omega)$ of the observed signal x(t). In other words, the positive frequency component of $X(\omega)$ is doubled.

Represented by $X(\omega)$, this is expressed by equation (7)

$$\tilde{X}(\omega) = (1 + \text{sgn}\omega) X(\omega) \tag{7}$$

Considering equation (5), this may be expressed as follows:

$$\tilde{X}(\omega) = X(\omega) + j\hat{X}(t) \tag{8}$$

Inverse Fourier conversion of either side of the above equation gives equation (9):

$$\tilde{x}(t) = x(t) + j\hat{x}(t) \tag{9}$$

In other words $\tilde{x}(t)$ is the inverse Fourier conversion of $\tilde{x}(\omega)$. In $\tilde{x}(t)$, which is a complex number signal, the real and the imaginary parts are related according to the Hilbert conversion. A signal of this type is generally referred to as an analytical signal. It is believed that analytical signal $\tilde{x}(t)$ is a complex vector expression of observed signal x(t), so that $\tilde{x}(t)$ may be expressed by equation (10).

$$\tilde{x}(t) = r(t) \cdot \exp(j\theta(t)) \tag{10}$$

where $$r(t) = [(x(t))^2 + (\hat{x}(t))^2]^{\frac{1}{2}} \tag{11}$$

$$\theta(t) = \tan^{-1} \frac{\hat{x}(t)}{x(t)} \tag{12}$$

Here r(t) represents instantaneous amplitude (envelope) and $\theta(t)$ instantaneous phase. Analytical signal $\hat{x}(t)$ does not include a negative frequency component so that $\theta(t)$ is a monotonically increasing function. The time differential of $\theta(t)$ indicates instantaneous frequency f(t) and is given by equation (13).

$$f(t) = \frac{1}{2\pi} \frac{d\theta(t)}{dt} \tag{13}$$

As a result, from the observed signal x(t), analytical signal $\hat{x}(t)$ can be obtained and the instantaneous amplitude, phase, and frequency thereof calculated. Furthermore, an analytical signal with a negative frequency component, if obtained, will be a complex conjugate of the analytical signal obtained from the positive frequency component, each having a phase opposite in sign to that of the other but having an equal local amplitude. As a result, the local frequency obtained from the two will be equal in their absolute values, differing only in sign. The observed signal represented by equation(14) was used as an example for analysis to clearly indicate that relation between the observed signal and analytical signal.

$$X(t) = \frac{1}{2}(1 + \sin(2\pi t)) \cdot \sin(20\pi t) \ldots \tag{14}$$

where $0 \leq t \leq 1$. The result of processing the above appears in FIG. 1.

This is a signal represented by a sine wave of frequency 10 Hz the amplitude of which gradually increases and decreases. Evidently from FIG. 1, r(t) represents the envelope of the signal, and $\theta(t)$ is a linear function that gives a constant frequency for the signal. Accordingly, f(t) has a constant value agreeing with the frequency of the signal.

Next, equation (15) represents a signal the frequency of which increases with time. The result of processing this signal appears in FIG. 2.

$$x(t) = \frac{1}{2}(1 + \sin(2\pi t)) \cdot \sin(40\pi t) \ldots \tag{15}$$

Here $\theta(t)$ is proportional to the square of time and f(t) proportional to time, allowing the instantaneous frequency of the signal to be determined correctly. In this way, by obtaining the analytical signal for an irregular signal, it is possible to isolate the amplitude and frequencies corresponding to every successive point of time. For example, where the observed signal is obtained as a product of the envelope signal undergoing a smooth change and having only a positive value and the carrier signal with both a positive and negative value and changing comparatively faster, the technology offered by this invention will allow the envelope signal and the carrier signal to be isolated from each other and determined from the observed signal. Furthermore, where the frequency of the carrier signal changes with time, the frequency of the carrier signal can be determined for any point of time.

However, the conventional difference treatment allows only the differential signal to be determined for the observed signal itself so that in this approach it is not possible to directly determine the frequency of the carrier signal.

Next, a causality is applied to Fourier conversion D(x,y) of the two-dimensional signal d(x,y) as is common with graphic data. In other words, the first image limit of the two-dimensional Fourier plane is multiplied four-fold, nullifying the rest of the image limits. If this is expressed as $\tilde{D}(\omega x, \omega y)$, then this is expressed as shown in equation (16).

$$\tilde{D}(\omega x, \omega y) = (1 + \text{sgn}\omega x)(1 + \text{sgn}\omega y) D(\omega x, \omega y) \ldots \tag{16}$$

Equation (17) is obtained through an inverse Fourier conversion of the above:

$$\tilde{d}(x,y) = d(x,y) - \hat{d}xy(x,y) + j(\hat{d}x(x,y) - \hat{d}y(x,y)) \ldots \quad (17)$$

where, $$\hat{d}xy(x,y) = d(x,y) * \frac{1}{\pi x} * \frac{1}{\pi y} \quad (18)$$

$$\hat{d}x(x,y) = d(x,y) * \frac{1}{\pi x} * \delta(y) \quad (19)$$

$$\hat{d}y(x,y) = d(x,y) * \frac{1}{\pi y} * \delta(y) \quad (20)$$

Here $d(\bar{x},y)$ is a complex number signal, the real and imaginary parts of which will be related through Hilbert conversion if a secondary Hilbert conversion is defined by equation (21). Accordingly, a two-dimensional analysis function is defined for $\tilde{d}(x,y)$.

$$\hat{d}(x,y) = \tfrac{1}{2}\left(d(x,y) * \frac{1}{\pi x} + d(x,y) * \frac{1}{\pi y}\right) \quad (21)$$

Since d(x,y) does not have any component except the first image limit on the two-dimensional Fourier plane, it is a signal with its phase extending along the positive directions of, respectively, the x and y axes. In other words, this corresponds to isolating, from among signals with their phases extending in different directions, a signal with its phases extending in, respectively, the x and y direction. Equation (22) expresses the complex vector of the two-dimensional analytical signal.

$$\tilde{d}(x,y) = r(x,y) \cdot \exp(j\theta(x,y)) \quad (22)$$

$$r(x,y) = |\tilde{d}(x,y)|$$

where $$= [[Re(\tilde{d}(x,y))]^2 + [Im(\tilde{d}(x,y))]^2]^{\tfrac{1}{2}}$$

$$\theta(x,y) = \tan^{-1}\left[\frac{Im(\tilde{d}(x,y))}{Re(\tilde{d}(x,y))}\right]$$

Here, r(x,y) and θ(x,y) are apparently expressions for, respectively, local amplitude and local phase of the graphic data. Thus, local frequency f(x,y) is obtained for the graphic data on the basis of the local gradient of the phases determined corresponding to the optimum fitness of four neighboring picture elements. In other words, if, respectively, θ(i,j), θ(i+1,j), θ(i,j+1), and θ(i+1,j+1) represent the phases of the four neighboring picture elements, equations (23), (24), and (25) will give the coefficients of the optimum plane $z = ax + by + c$ for which the sum of the squares of error is minimum.

$$a = \frac{\theta(i+1,j) + \theta(i+1,j+1)}{2} - \frac{\theta(i,j) + \theta(i,j+1)}{2} \quad (23)$$

$$b = \frac{\theta(i,j+1) + \theta(i+1,j+1)}{2} - \frac{\theta(i,j) + \theta(i+1,j)}{2} \quad (24)$$

$$c = \tfrac{1}{4}(3\theta(i,j) + \theta(i+1,j) + \theta(i,j+1) - \quad (25)$$

$$\theta(i+1,j+1)) - (a - jb)$$

$$f(x,y) = \frac{1}{2\pi}\sqrt{a^2 + b^2} \quad (26)$$

Accordingly, local frequency f(x,y), is given by equation (26) as the magnitude of the gradients of this plane. The contour lines in FIG. 3 are an expression of the graphic data built on the basis of the results of calculation. In FIG. 3, d represents the concentration (luminance) while the firm and the dotted lines represent, respectively, bright convex and dark concave areas.

FIG. 4 represents the graphic data corresponding to the local frequencies.

Furthermore, there are apparently four two-dimensional analytical signals depending upon which image limit on the two-dimensional Fourier plane is to be projected for each of which two-dimensional complex signals may be obtained with their respective phases in mutually different directions. These, however, are not independent of each other, all having equal local amplitude, differing only in phase. However, since the phases also are in a specific dependency relation so that the size of the local gradient of a phase will always have the same value whichever two-dimensional analytical function it is obtained from.

BRIEF DESCRIPTION OF DRAWINGS

FIGS. 1 and 2 are diagrams showing the electrical characteristics;

FIG. 3 is a drawing showing the concentration by means of contour lines; and

FIG. 4 is a drawing showing local frequencies by means of contour lines.

FIG. 5 is a block diagram of the entire graphic data processor; and

FIG. 6 is a block diagram for the gradient calculator in FIG. 5.

FIG. 8 is a flow chart of the secondary Fourier conversion in embodiment III of this invention.

FIG. 9 is a flow chart showing inverse secondary Fourier conversion in embodiment III of this invention.

FIG. 10 is a flow chart for determination of local amplitude, local phase, and local frequency in example III of this invention.

FIG. 13 is a flow chart of one-dimensional Fourier conversion and inverse one-dimensional Fourier conversion in embodiment IV of this invention.

FIG. 14 is a flow chart for determination of instantaneous frequency in embodiment IV of this invention.

DESCRIPTION OF THE PREFERRED EMBODIMENT I

Figure 1:
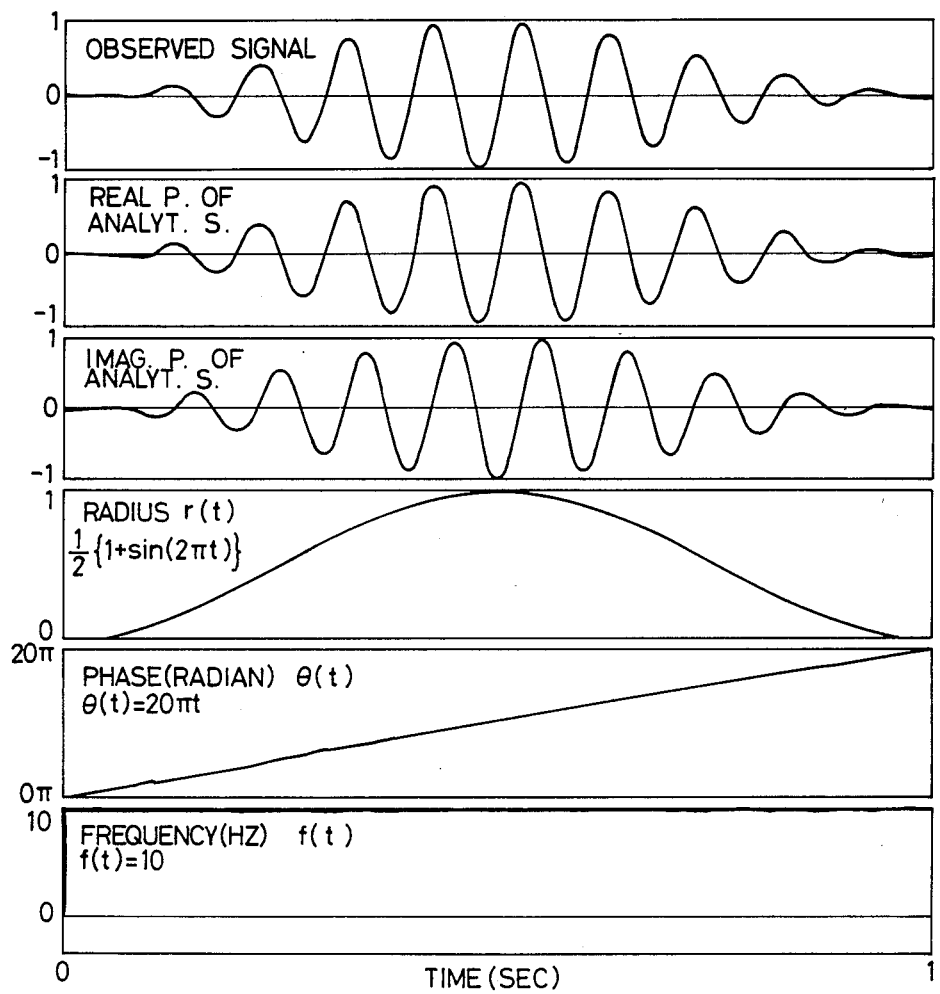
FIGS. 1 to 4 are explanations of the principle underlying this invention where.
Figure 2:
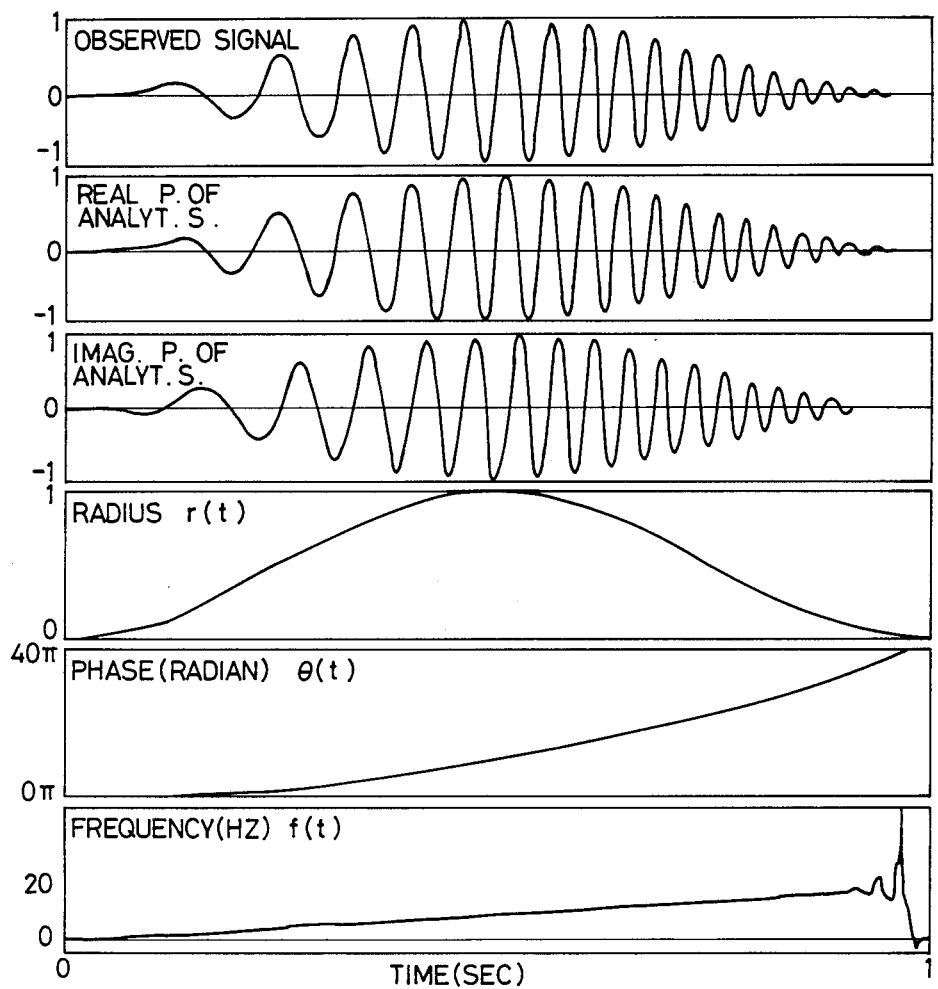
Figure 3:
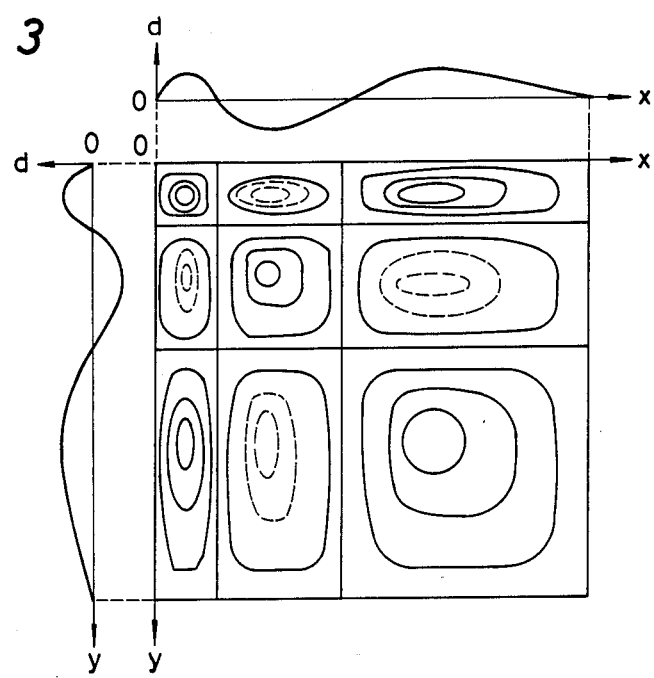
Figure 4:
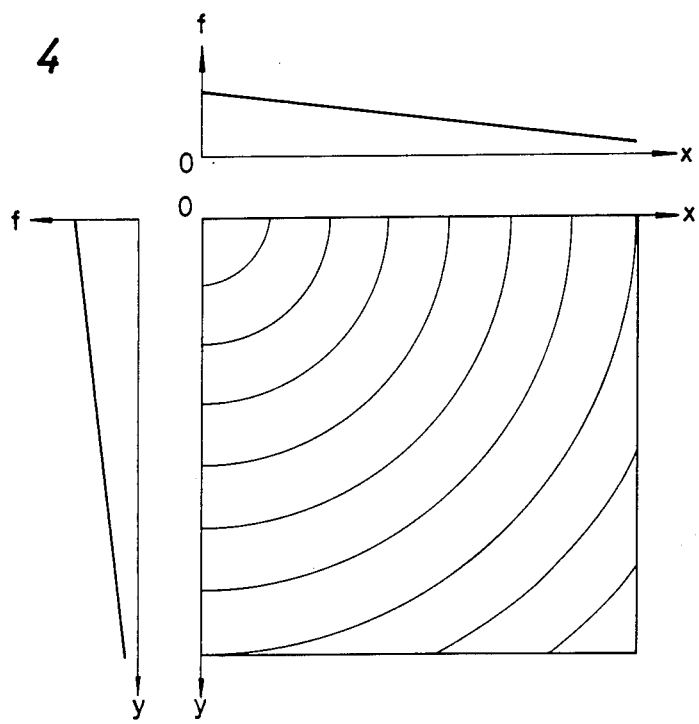
Figure 5:
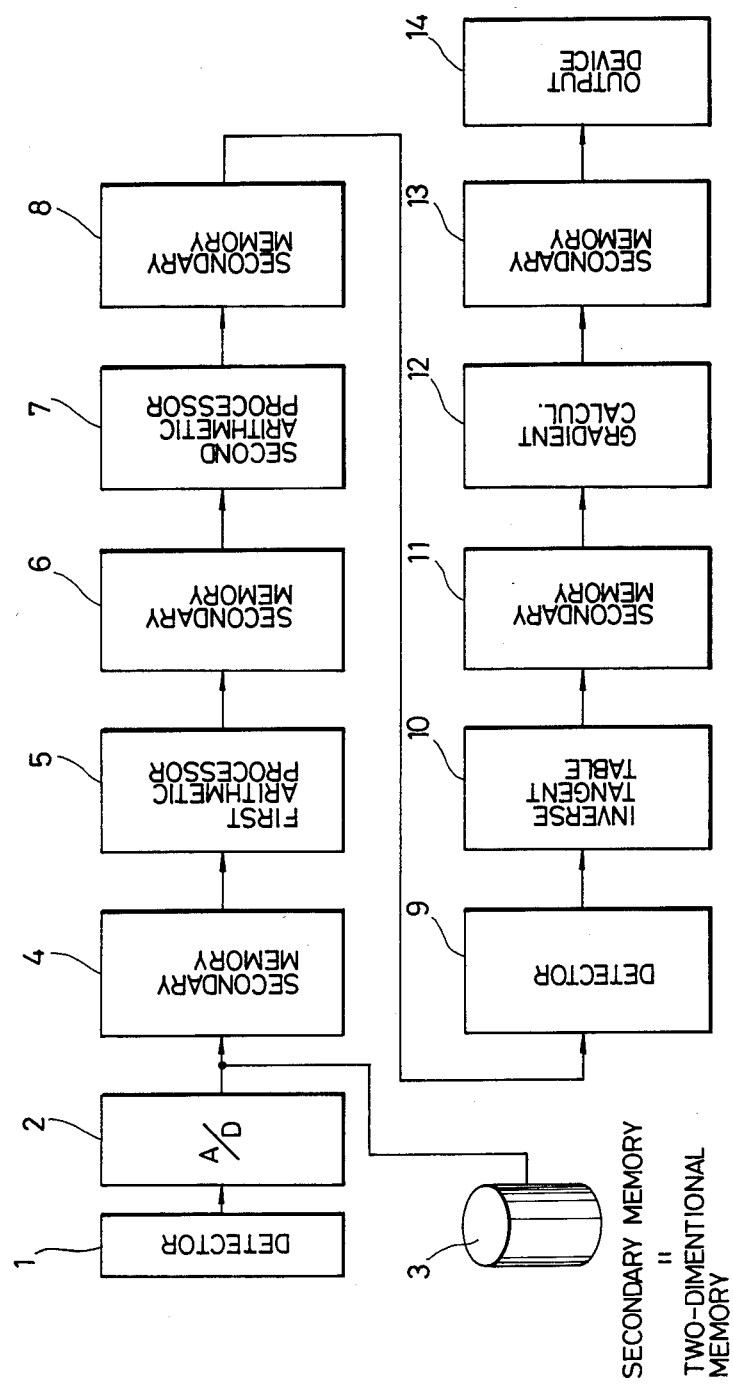
FIGS. 5 and 6 are block diagrams of an illustrative graphic data processor in accordance with embodiment I of the invention, which typically processes therapeutical graphic data where.
Figure 6:
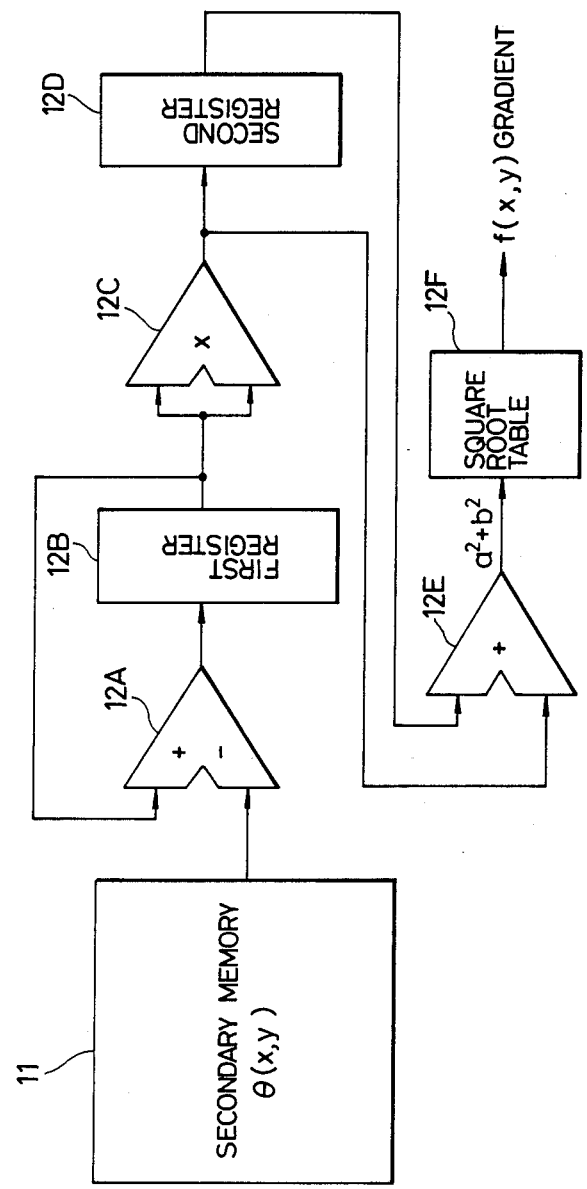

FIGS. 5 and 6 explain the graphic data processor in embodiment I of this invention, concerning therapeutic graphic data like tomographs, CT data, etc. FIG. 5 is a block diagram showing the entire configuration of said graphic data processors while FIG. 6 is a block diagram showing the details of the gradient calculator shown in FIG. 5.

In FIG. 5, 1 represents an observed signal detector like a light detector for the TV cameras, radiation detectors for the dose of radiation relating to x-ray pictures, or ultrasonic devices for the ultrasonic graphic data. In this figure, 2 represents an analog/digital converter, which converts the observed signals into digital signals and 3 represents an auxiliary storage device such as a magnetic disk or a magnetic tape device. Secondary memories are represented by, respectively, 4, 6, 8, 11 and 13, while 5 and 7 are respectively, first and the second arithmetic processors. A divider 9 and inverse tangent table 10 are also provided. A gradient calculator 12 may comprise, as shown in FIG. 6, an adder-subtracter 12a, a first register 12b, multiplier 12c, a second register 12d, an adder 12e, and a square root table 12f. An output device 14 may correspond to a TV monitor, a film lighting device, a printer, etc.

Controllers used for the above devices are based on the usual methods, and therefore, details thereof are omitted from this description.

The following is a description of the graphic data processor in example I, based on the application of the principles underlying this invention to ultrasonic tomography.

Thus, it is assumed here, that ultrasonic graphic data is subjected to two-dimensional Fourier analysis nullifying all by one of the components from the first to the fourth image limits on the Fourier plane, followed by two-dimensional inverse Fourier conversion.

In FIGS. 5 and 6, ultrasonic tomographs are detected by the ultrasonic tomographic device corresponding to observed signal detector 1. In other words, an ultrasonic pulse beam having directivity is radiated on the body under examination, receiving the signals given back as response from areas differing in audio impedance, specifying the position within the body under examination on the basis of the time elapsing between radiations of the ultrasonic pulses and reception of signals emitted in response and also the direction of ultrasonic pulse radiation, obtaining the correspondence between the size of reflected signals and the concentration, converting into graphic data the change in audio impedance from place to place in the body under examination, and thereby, obtaining the ultrasonic tomographic images.

Figure 11:
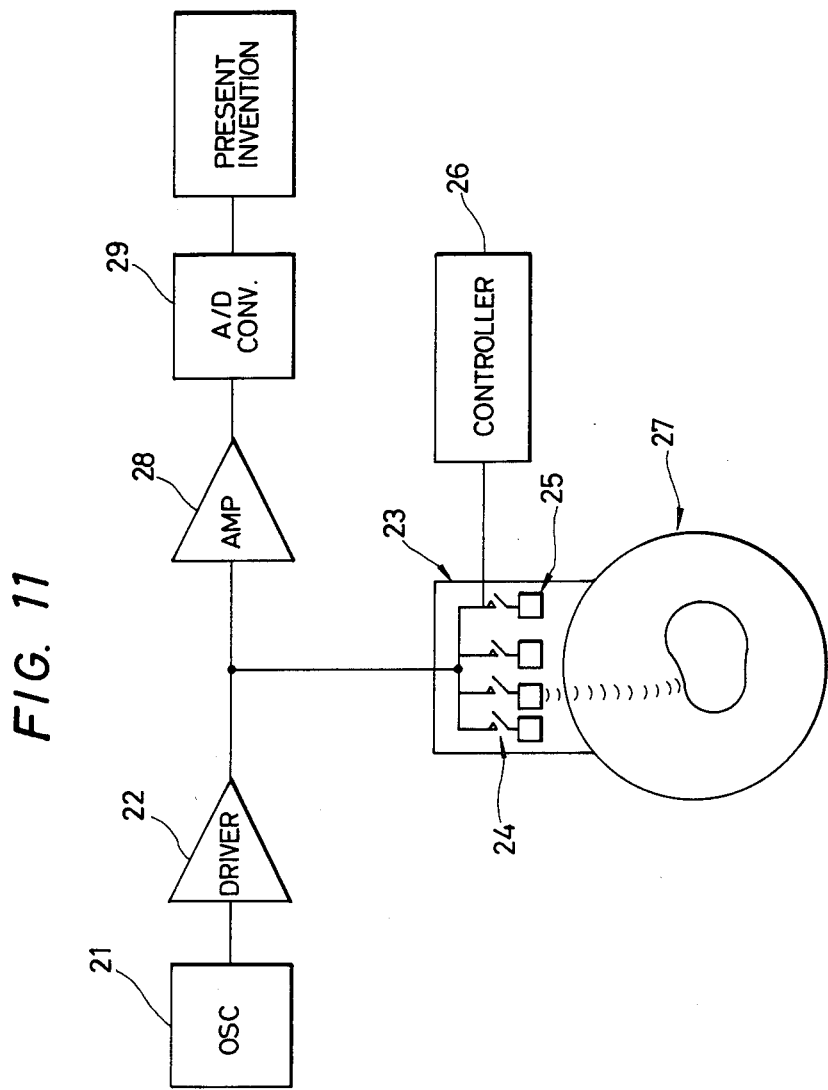
FIG. 11 is a block diagram of illustrating connections of circuit components for obtaining observed graphic data.

FIG. 11 is a block diagram illustrating connections of circuit components for obtaining observed graphic data. Pulse signals generated from an oscillator 21 are inputted through a driver 22 to a US probe 23 in which analog switches 24 and piezoelectric transducer (PZT) array 25 are included. An ultrasonic pulse beam is radiated from the US probe 23 in response to a control signal from a controller 26 into a body under examination 27. Upon radiation, the PZT array 25 receives an echo signal indicating a level of audio impedance and the depth of the body where the beam is reflected. The echo signals thus obtained are fet through an amplifier 28 to an analog/digital (A/D) converter 29 which corresponds in FIG. 5 to the one designated by reference numeral 2.

The following describes the operations involved in determining the local frequencies of, respectively, the two-dimensional analytical signals and the graphic data. The above ultrasonic reflected signals are converted into digital signals by analog/digital (A/D) converter 2 and fed to two-dimensional memory 4. Observed signals stored in two-dimensional memory 4 are subjected to two-dimensional Fourier conversion of two-dimensional signals in first arithmetic processor 5, and further the values obtained by the arithmetic processor 5 are stored in two-dimensional memory 6. Contents of two-dimensional memory 6 stored after Fourier conversion re read out in such a way as to nullify the negative frequencty components, leaving only the positive frequency components which are then subjected to inverse Fourier conversion in second arithmetic processor 7 to obtain the value given by equation (17) which is then stored in two-dimensional memory 8.

Next, the value in two-dimensional memory 8 is read and, using divider 9, $$\frac{Im(\tilde{d}(x,y))}{Re(\tilde{d}(x,y))}$$

is determined, this being then sent to inverse tangent table 10 to obtain $$\theta(x,y) = \tan^{-1}\left[\frac{Im(\tilde{d}(x,y))}{Re(\tilde{d}(x,y))}\right]$$

This value is stored in two-dimensional memory 11. The value of $\theta(x,y)$ stored in memory 11 represents local phase, FIG. 6 describes in detail the operation involved in obtaining local frequency f(x,y) by gradient calculator 12 from local phase $\theta(x,y)$.

To begin with, first register 12b is zero-cleared, the four picture elements $\theta(i,j)$, $\theta(i+1,j)$, $\theta(i,j+1)$, and $\theta(i+1,j+1)$ neighboring on local frequency $\theta(x,y)$ are read successively from two-dimensional memory 1, values of these four picture elements are added to or subtracted from the contents in first register 12B by using adder-subtracter 12A, determining a in (23). Immediately hereafter, multiplier 12C is used to obtain from this result, value $a^2$, this being stored in second register 12D.

Next, using the same procedure, equation (24) is executed in order to obtain the value b in first register 12B, obtaining $b^2$ by using multiplier 12C. The value $b^2$ is fed into adder 12E. Using adder 12E, contents $a^2$ and $b^2$ of second register 12D are added and the value of the gradient f(x,y) worked out by using square root table 12F. In this way, gradient calculator 12 is used to determine the value of local frequency f(x,y) in equation (26), storing the results in two-dimensional memory 13. The value of local frequency f(x,y) stored in two-dimensional memory 13 is displayed by output device 14.

According to embodiment I, the two-dimensional analytical signal can be determined from ultrasonic tomographic sgnals, determining from the local gradient of the phase thereof the local spatial frequency of the graphic data and thereby the local frequency graphic data whereby it is possible to determine the local composition of the body under examination, offering a new parameter for diagnosis.

It is possible, for example, to carry out quantitative diagnosis vased on differential diagnostic criteria (in particular, refer to FIG. 7) of a mammary gland tumor as referred to under section 5 (sampling tissue characteristics), page 210 to 211, in Graphic Data Engineering in Therapeutics, contained in the collection of reports of the Thirteenth Radiographic Symposium (Nov. 5-6, 1981), these reports being incorporated herein by reference. Conventionally, malignant and benign tumors are distinguished one from the other on the basis of experience, referring to the echoes from the periphery, interior, and anterior parts of the tumors. This invention improves the probability of correctness of a diagnosis making quantitative diagnosis of tissues possible on the basis of local frequency graphic data corresponding to specific locations.

DESCRIPTION OF THE PREFERRED EMBODIMENT II

Figure 7:
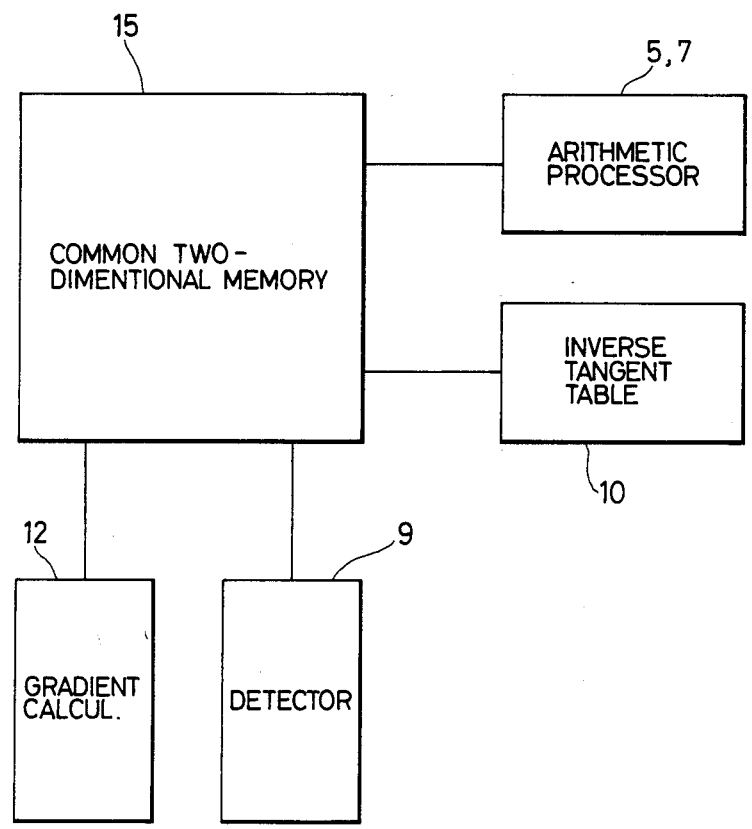
FIG. 7 is a block diagram of another illustrative graphic data processor in accordance with embodiment II of this invention.

FIG. 7 is a block diagram of the graphic data processor in embodiment II of this invention.

In the graphic data processor of embodiment II, functions of two-dimensional memories 4, 6, 8, 11 and 13 of the graphic data processor in embodiment I are combined into a common two-dimensional memory 15.

Operations of the graphic data processor in embodiment II are identical to those of the graphic data processor in embodiment I and are, therefor, omitted from the description.

DESCRIPTION OF THE PREFERRED EMBODIMENT III

Figure 8:
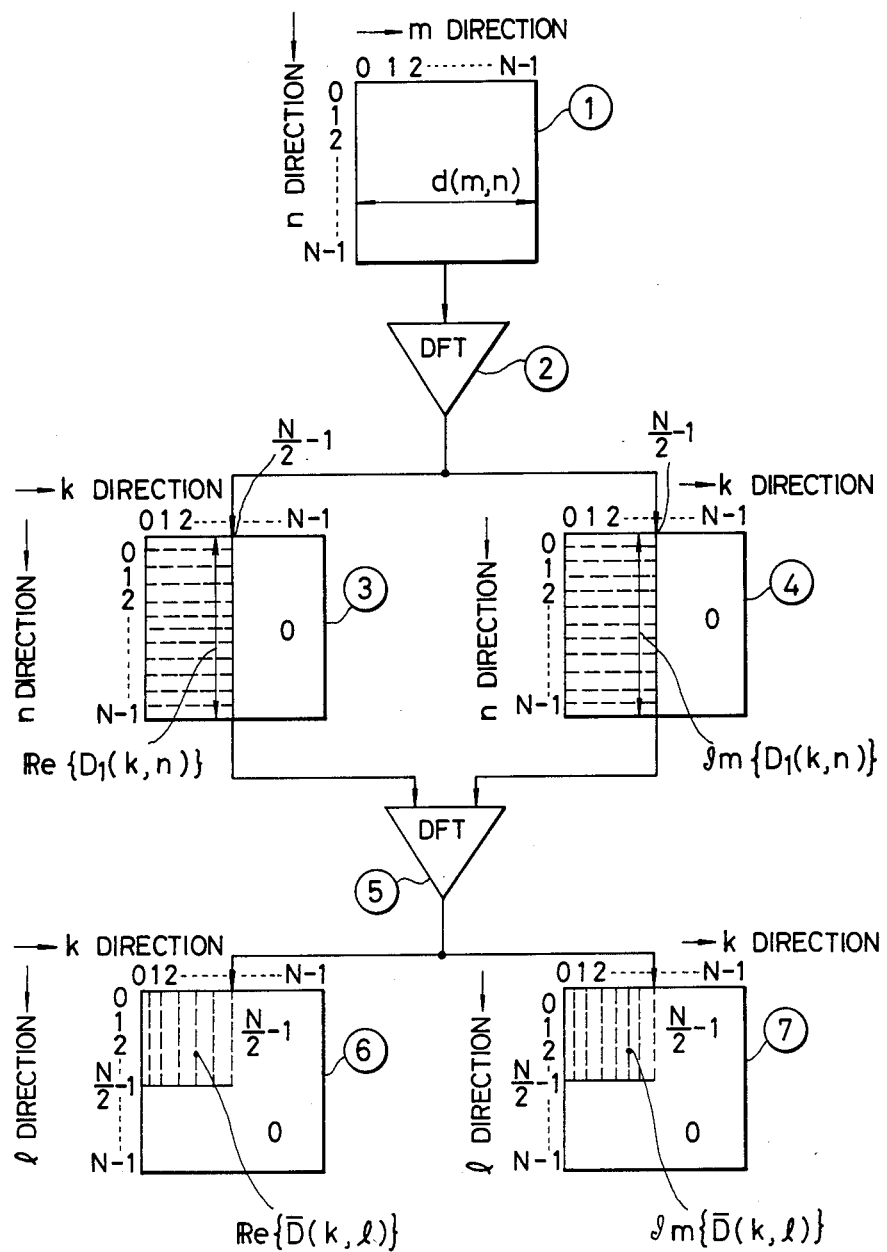
FIGS. 8 to 10 are flow charts describing the operation of an illustrative graphic data processor in accordance with embodiment III of this invention where.
Figure 9:
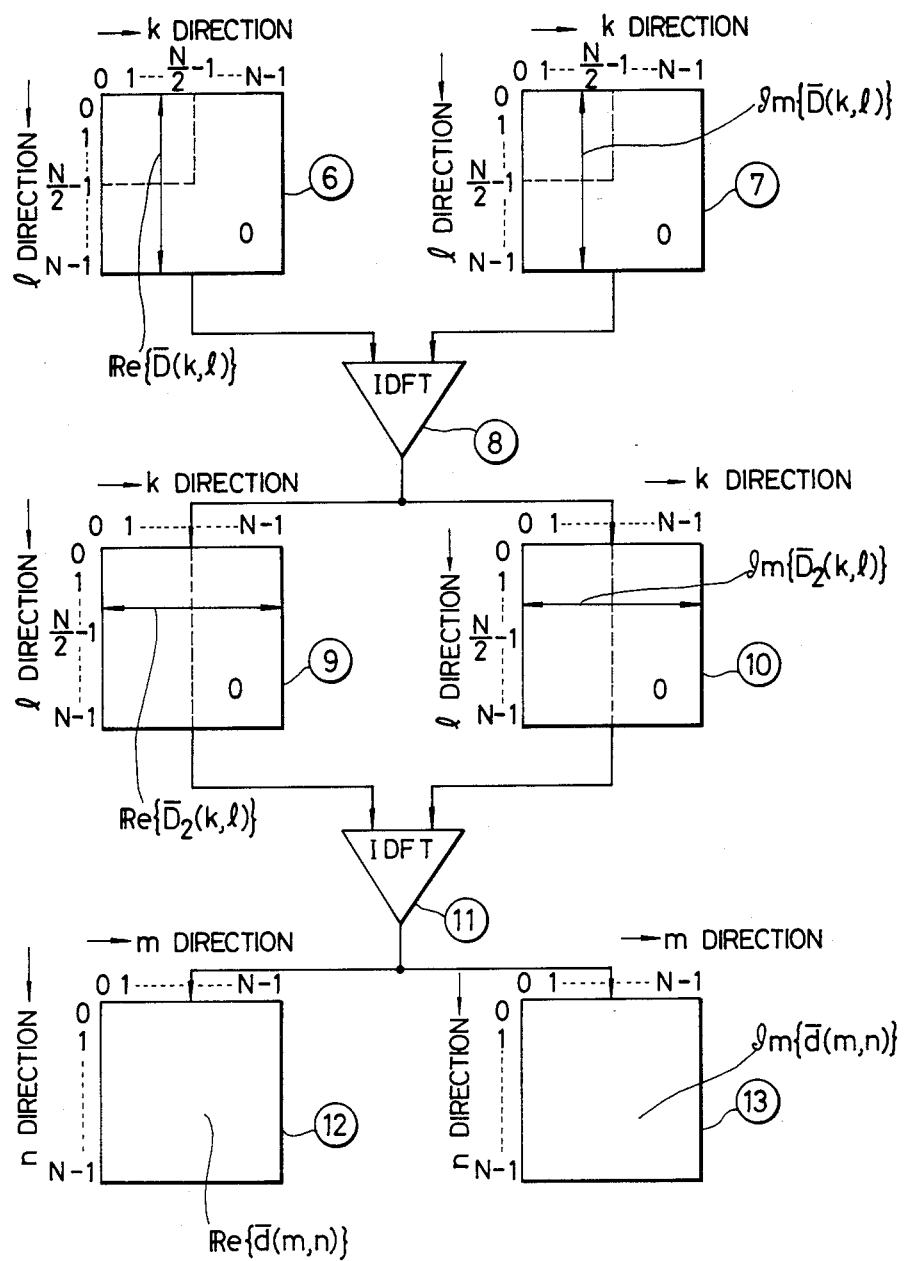
Figure 10:
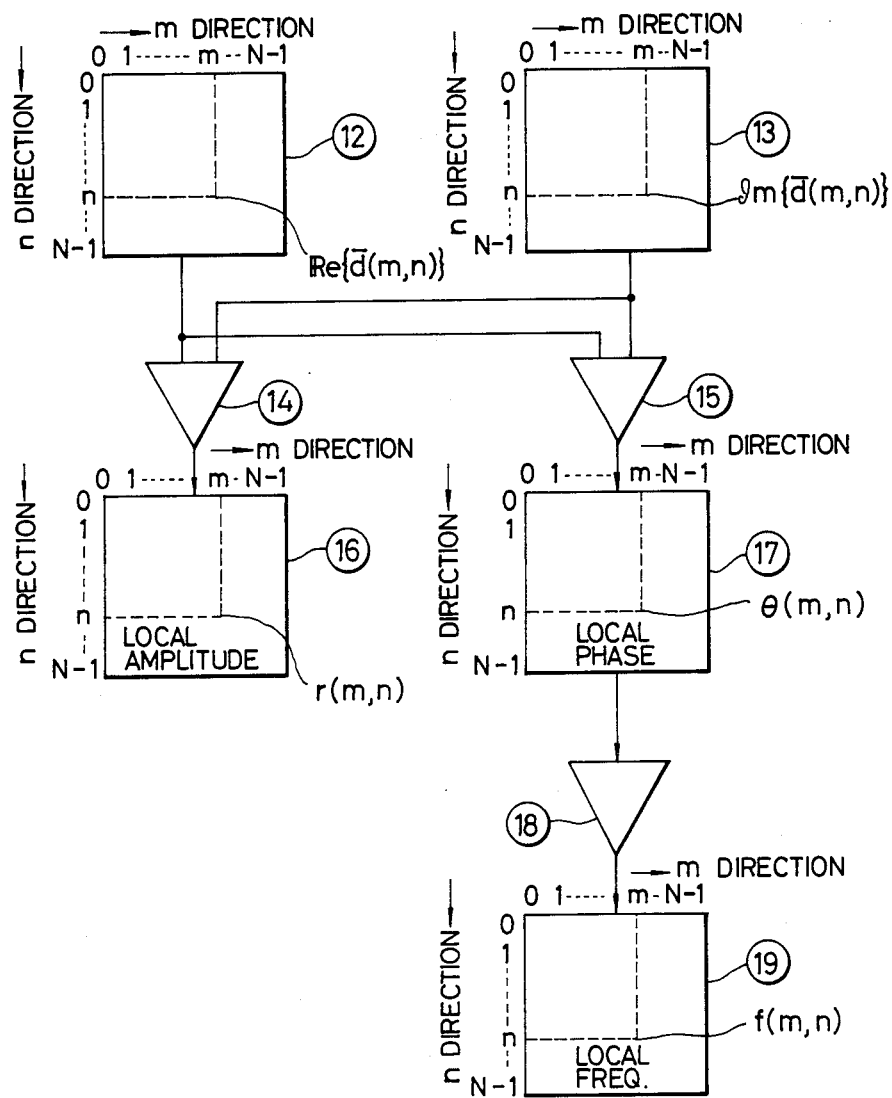

FIGS. 8 to 10 are flow charts describing the operation of the graphic data processor in embodiment III of this invention. FIG. 8 is a flow chart of the two-dimensional Fourier conversion (determining only the positive frequency component) in this embodiment. FIG. 9 is a flow chart of the inverse two-dimensional Fourier conversion and FIG. 10, a flow chart of the calculations involved in the determination of local amplitude, local phase, and local frequency, Furthermore, the * indicates the direction of single dimensional Fourier conversion or that of single dimensional inverse Fourier conversion.

In the graphic data processor of embodiment III, all the operations of two-dimensional memory 4 and the following components in embodiment I are preformed by a computer.

The following describes the operation of the graphic data processor in embodiment III. This operation is implemented in the same manner as is done in embodiments I or III.

(A) Operations of the Two-dimensional Fourier Converter.

In FIG. 8, the observed signals (original graphic data) n=0, 1, 2, ..., N−1 in computer memory of block (1) are subjected to Fourier conversion.

$$D_1(k,n) = \sum_{m=0}^{N-1} d(m,n) \cdot \exp\left(-j2\pi \frac{mk}{N}\right)$$

repeating this N times at (2).

Here, k=0, 1, 2, ..., N−1, taking one dimensional Fourier conversion $D_1(k,n)=0$ for k=N/2, ..., N−1. Also, j in the above equation represents the imaginary number.

As shown by the transverse dotted lines in blocks (3) and (4), operations (2) makes it possible to obtain, respectively, the values of the real and the imaginary parts on the left side of the one-dimensional Fourier conversion plane in the m direction of the observed signal.

Next, one-dimensional Fourier conversion $$\widetilde{D}(k,l) = \sum_{n=0}^{N-1} D_1(k,n) \cdot \exp\left(-j2\pi \frac{nl}{N}\right)$$

is carried out at (5) N/2 times for observed signals k=0, 1, 2, ..., N−1.

Here one-dimensional Fourier conversion $\widetilde{D}(k,l)=0$ is performed for l=N/2, ..., N−1. In the above, j represents the imaginary number.

Longitudinal dotted lines in blocks (6) and (7) show operation (5) makes it possible to obtain the values of, respectively, the real and the imaginary parts of the observed signal on the one-dimensional Fourier conversion plane in the n direction at ¼ the distance from the left (this corresponding to the positive frequency components). The source code of the above-described operataion is shown below.

```
A(I,J) = d(I,J)      B(I,J) = 0.0
Integer*4            MM, M, NN, K, FUGO, ICON
Real*4               A(M,M), B(M,M)
NN = 2
FUGO = 1
CALL FFT(A,B,MM,NN,FUGO,ICON)
K = M/2
DO 100  J = 2, K
DO 100  I = 2, K
    A(I,J) = 2*A(I,J)
    B(I,J) = 2*B(I,J)
100 CONTINUE
DO 200  J = K+1, M
DO 200  I = 1, M
    A(I,J) = 0.0
    B(I,J) = 0.0
200 CONTINUE
DO 300  J = 1, K
DO 300  I = K+1, M
    A(I,J) = 0.0
    B(I,J) = 0.0
300 CONTINUE
FUGO = −1
CALL FFT(A,B,MM,NN,FUGO,ICON)
d(I,J) = A(I,J) + jB(I,J)
```

In the above source code listing of the program,
FFT: a subroutine of fast Fourier transform
d(I,J): an analytical signal data argument of the subroutine of FFT
A: Real Part
B: Imaginary Part
NM: the size of dimension
NN: Dimensionality
FUGO: 1; Fourier conversion −1; inverse Fourier conversion
ICON: status when subroutine is operated
(B) Operations involved in Inverse Fourier Conversion.

The system in FIG. 9 performs n successive N/2 inverse one-dimensional Fourier conversion (8)

$$\overline{D}_2(k,n) = \frac{1}{N} \sum_{l=0}^{N/2-1} D(k,l) \cdot \exp\left(j2\pi \frac{nl}{N}\right)$$

on the real and imaginary parts of the two-dimensional Fourier conversion value in said blocks (6) and (7) (K=0, 1, 2, ..., N/2−1). In the above equation, j represents the imaginary number.

As the longitudinal dotted line in blocks (9) and (10) indicate, operation (8) makes it possible to obtain the values of, respectively, the real and the imaginary parts for the top half and n direction of the inverse one-dimensional Fourier conversion plane corresponding to the observed signals.

This is followed by N inverse one-dimensional Fourier conversions (operation 11) on the above inverse one-dimensional Fourier conversion plane blocks (8) and (10) for n=0, 1, 2, ..., N−1.

$$\tilde{d}(m,n) = \frac{1}{N} \sum_{K=0}^{N/2-1} \overline{D}_2(k,n) \cdot \exp\left(j2\pi \frac{km}{N}\right)$$

Operation (11) makes it possible to obtain the values of real part $Re(\tilde{d}(m,n))$, imaginary part $Im(\tilde{d}(m,n))$ of the two-dimensional analytical signal for blocks (12) and (13).

(C) Operations involved in the Determination of Local Amplitude, Local Phase and Local Frequency.

In FIG. 10, operations (14) and (15) are performed to obtain, from the values of, respectively, the real part $Re(\tilde{d}(m,n))$ and imaginary part $Im(\tilde{d}(m,n))$ of the two-dimensional analytical signal in blocks 12 and 13, local amplitude $$r(m,n) = [Re(\tilde{d}(m,n))^2 + Im(\tilde{d}(m,n))^2]^{\frac{1}{2}}$$

and local phase $$\theta(m,n) = \tan^{-1}\{Im(\tilde{d}(m,n))/Re(\tilde{d}(m,n))\}$$

Operation (18) is used to determine the local frequency f(m,n) from the local gradient of local phases θ(m,n) in block (17) of the above results. In other words, local frequency is determined by carrying out operatoins of equations (23), (24), (25) and (26).

DESCRIPTION OF THE PREFERRED EMBODIMENT IV

Figure 12:
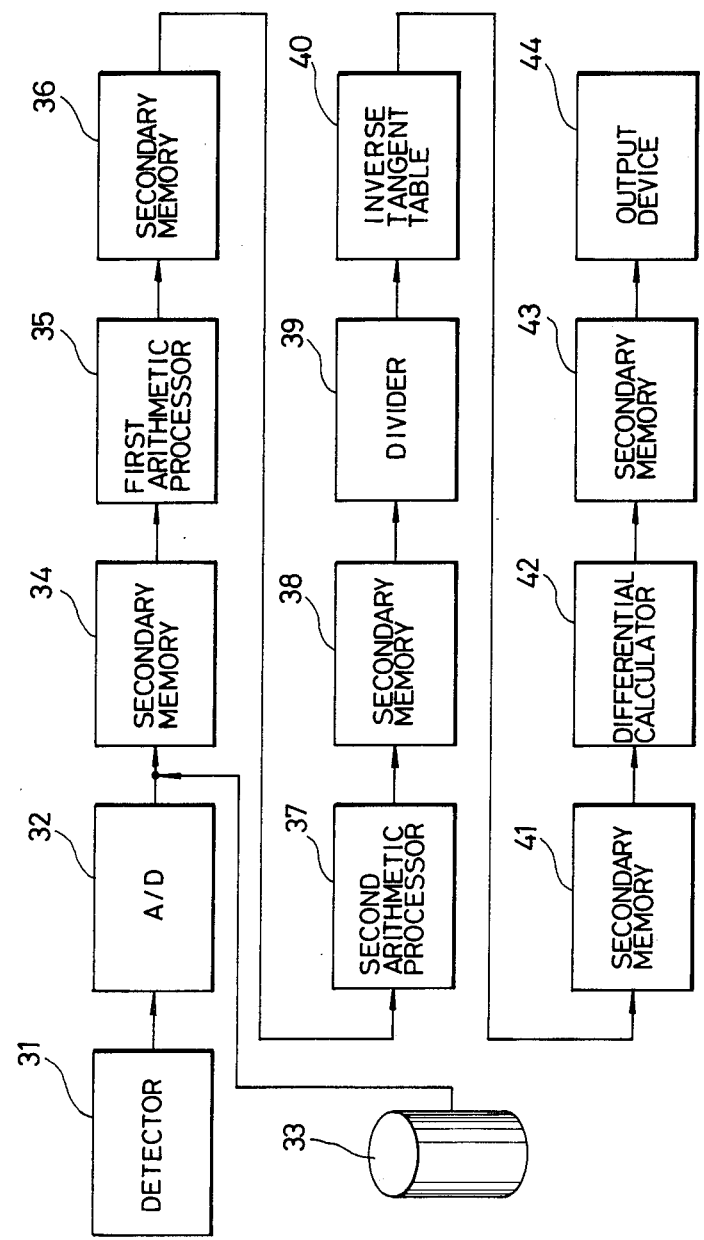
FIG. 12 is a block diagram of an illustrative graphic data processor in accordance with embodiment IV of this invention.
Figure 13:
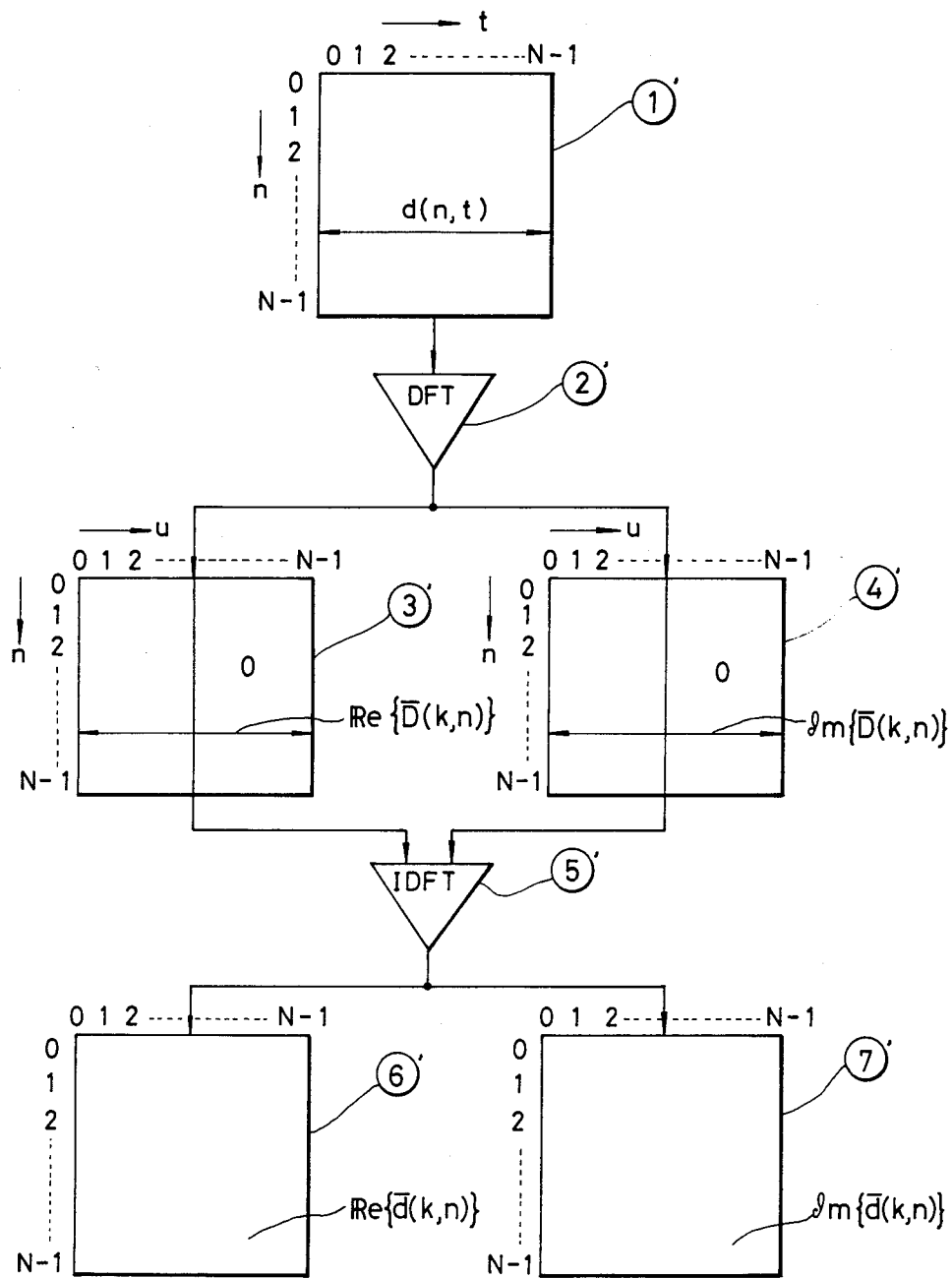
FIGS. 13 and 14 are flow charts describing the operation of an illustrative graphic data processor in accordance with embodiment IV of this invention where.
Figure 14:
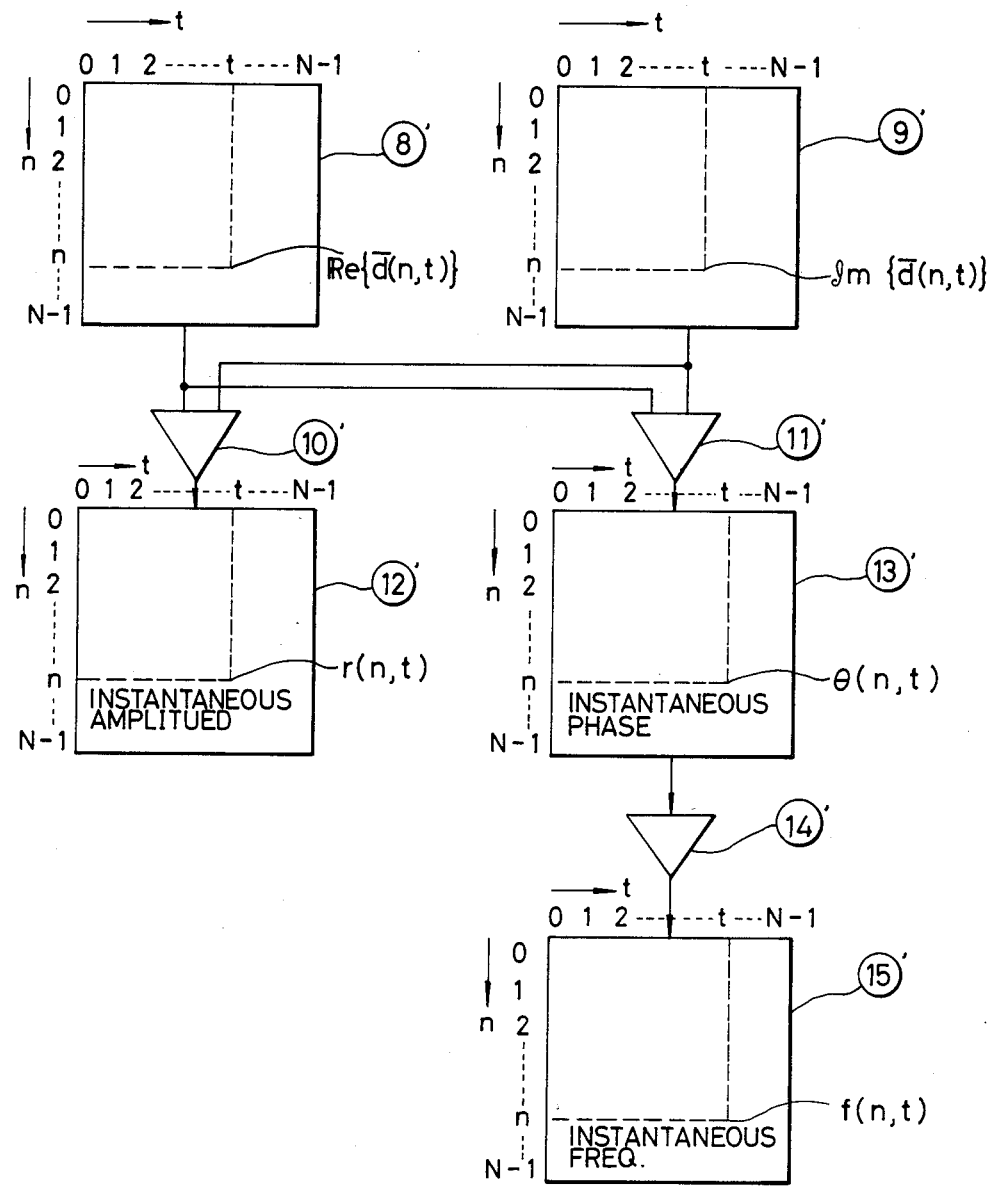

FIGS. 12 through 14 illustrate the graphic data processor in embodiment IV of this invention, concerning therapeutic graphic data like tomographs, CT data, etc.

FIG. 12 is a block diagram showing the entire configuration of the graphic data processor while FIGS. 13 and 14 are flow charts in which all the operations of two-dimensional memory 34 and the flowing components in Fig. 12 are performed by a computer. And furthermore, FIG. 13 is a flow chart of one-dimensional Fourier conversion (determining only the positive frequency components) and the inverse one-dimensional Fourier conversion.

FIG. 14 is a flow chart of calculating instantaneous amplitude, instantaneous phase, and instantaneous frequency.

In FIG. 12, an ultrasonic pulse beam having directivity is radiated on the body under examination, receiving the signals given back as response from areas differnig in audio impedance, and specifying the position within the body under examination on tha basis of the time elapsing between radiations of the ultrasonic pulses and reception of signals emitted in response and also the direction of ultrasonic pulse radiation. The received signals are fed to an analog/digital (A/D) converter 32, and are stored in two-dimensional memory 34 according to the direction and an elapsing time of pulse radiation.

The following describes the operation involved in determining the one-dimensional analytical signals and the instataneous frequencies. In the first arithmetic processor 35, one-dimensional Fourier conversion on time with respect to a predetermined direction of a pulse beam is applied to the observed signals stored in two-dimensional memory 34. And the resultant values are memorized, in order, in two-dimensional memory 36 according to the direction of pulse radiation. Contents of two-dimensional memory 36 stored after one-dimensional Fourier conversion are read out in such a way as to nullify the negative frequency components, leaving only the positive frequency components which are then subjected to inverse one-dimensional Fourier conversion with respect to a predetermined direction of a pulse beam in the second arithmetic processor 37 to obtain one-dimensional analyticadl signals. The one-dimensional analytical signals are memorized in two-dimensional memory 38. Next, the value in two-dimensional memory 38 is read out and, using divider 39.

$$\frac{Im[d(n,t)]}{Re[d(n,t)]}$$

is determined. Here, n is a number of a direction of a pulse beam, and t is a elapsing time of the pulse beam with respect to each direction of the pulse beams. This is then sent to inverse tangent table 40 to obtain $$\theta(n,t) = \tan^{-1}\left[\frac{Im[d(n,t)]}{Re[d(n,t)]}\right]$$

This value is stored in two-dimensional memory 41. The value of θ(n,t) stored in memory 41 represents instantaneous phase.

Each of the two adjacent elements of the instantaneous phases with respect to time-axis is inputted, in order, to a differential calculator 42, thereby obtaining an instantaneous frequency f(n,t) shown by the following equation in the differential calculator 42.

$$f(n,t) = \frac{1}{2\pi} [\theta(n,t+1) - \theta(n,t)]$$

The value of the instantaneous frequency f(n,t) is memorized in two-dimensional memory 43, and is displayed by output device 44.

EFFECTS OF THE INVENTION

The following are the effects of the invention described above:

(1) Quantitative detection of local composition or dot pattern for the observed signals in a graphic data processor by performing two-dimensional Fourier conversion of observed signal, nullifying all but one of the components from the first to the fourth of the image limits on the corresponding two-dimensional Fourier plane, followed by generating graphic data through two-dimensional inverse Fourier conversion, said graphic data being used for the determination of the phase component of said graphic data signal, determining local gradient from said phase component, and obtaining local frequency of graphic data from local gradient of said phase.

(2) Determining, from (1) above, characteristic local fluctuations, in the CT value of the body examined or the frequency component of different system noises appearing in x-ray CT graphic data on the body being examined.

(3) Obtaining, from (1) above, local frequencies in ultrasonic tomographs, thereby quantitatively determining local differences in the densities of scatterings on the body under examination, (4) Improving the precision of diagnosis and examinations through (1) to (3) above.

The above invention is obviously not limited to the scope of the embodiments described above but may be modified in different ways as long as the underlying principles are not violated.

For example, even though the examples cited above relate to applications of this invention to medical fields, the invention may be applied to examination of the uniformity for granular status on the surface of the graphic data obtained on materials or examination of the stage of mixing of two or more materials.

We claim:

1. A method for processing observed data signals comprising the steps of:
    (a) effecting one-dimensional Fourier conversion of said observed graphic data signals;
    (b) determining of one-dimensional analytic signals of graphic data, including effecting inverse one-dimensional Fourier conversion on the resultant of said one-dimensional Fourier conversion of the observed graphic data signals to derive the one-dimensional analytic signals; and
    (c) determining the instantaneous frequencies of the one-dimensional analytic signals including calculating the differences in output phases of said one-dimensional analytic signals.

2. A method for processing two-dimensional signals such as observed graphic data of a body under examination comprising the steps of:
    (1) effecting two-dimensional Fourier conversion of the observed graphic data signals to obtain the frequency components of said observed graphic data signals in a two-dimensional Fourier plane;
    (2) forming processed graphic data including the steps of nullifying the negative frequency components and leaving only the positive frequency components in said two-dimensional Fourier plane, and (b) effecting two-dimensional inverse Fourier conversion on said frequency components subjected to the operation of the step (a) to obtain analytical signals of said graphic data signals;
    (3) determining the phase components of said analytic signals; and
    (4) determining the instantaneous frequencies of said phase components.

3. A method for processing two-dimensional signals as defined in claim 2, further comprising the steps of:
    (5) obtaining said observed graphic data including radiating an ultrasonic pulse beam with directivity within a body under examination,
    (6) receiving signals reflected from locations with varying audio impedances,
    (7) specifying locations within the body under examination on the basis of the time elapsing between radiation of pulses to the reception of the corresponding reflected signals and also the direction of pulses issued,
    (8) obtaining a correspondence between the size of the reflected signals and a luminance value, and
    (9) deriving ultrasonic tomographs which convert the change in audio impedance from location to location in the body under examination into said observed graphic data.

4. A. method for processing two-dimensional signals defined in claim 2, further comprising in step (a), obtaining said observed graphic data utilizing an X-ray scanner.

5. A method for processing two-dimensional signals such as observed graphic data of a body under examination comprising the steps of:
    (a) effecting two-dimensional Fourier conversion of the observed graphic data signals such that components occur with respect to first through fourth image limits on the resultant two-dimensional Fourier plane;
    (b) forming processed graphic data including nullifying all but one of the said components from the first through fourth image limits, and effecting two-dimensional inverse Fourier conversion on said one component to derive said processed graphic data;
    (c) determining the phase component of said processed graphic data;
    (d) determining the local gradient of said phase component;
    (e) obtaining said observed graphic data including radiating an ultrasonic pulse beam with directivity within a body under examination;
    (f) receiving signals reflected from locations with varying audio impedances;
    (g) specifying locations within the body under examination on the basis of the time elapsing between radiation of pulses to the reception of the corresponding reflected signals and also the direction of pulses issued;
    (h) obtaining a correspondence between the size of the reflected signals and a luminance value; and
    (i) deriving ultrasonic tomographs which convert the change in audio impedance from location to location in the body under examination into said observed graphic data.

* * * * *